C. W. DESOBRY.
APPARATUS FOR HEATING AND COOLING LIQUIDS.
APPLICATION FILED MAR. 17, 1919.
1,373,953.
Patented Apr. 5, 1921.
2 SHEETS—SHEET 2.
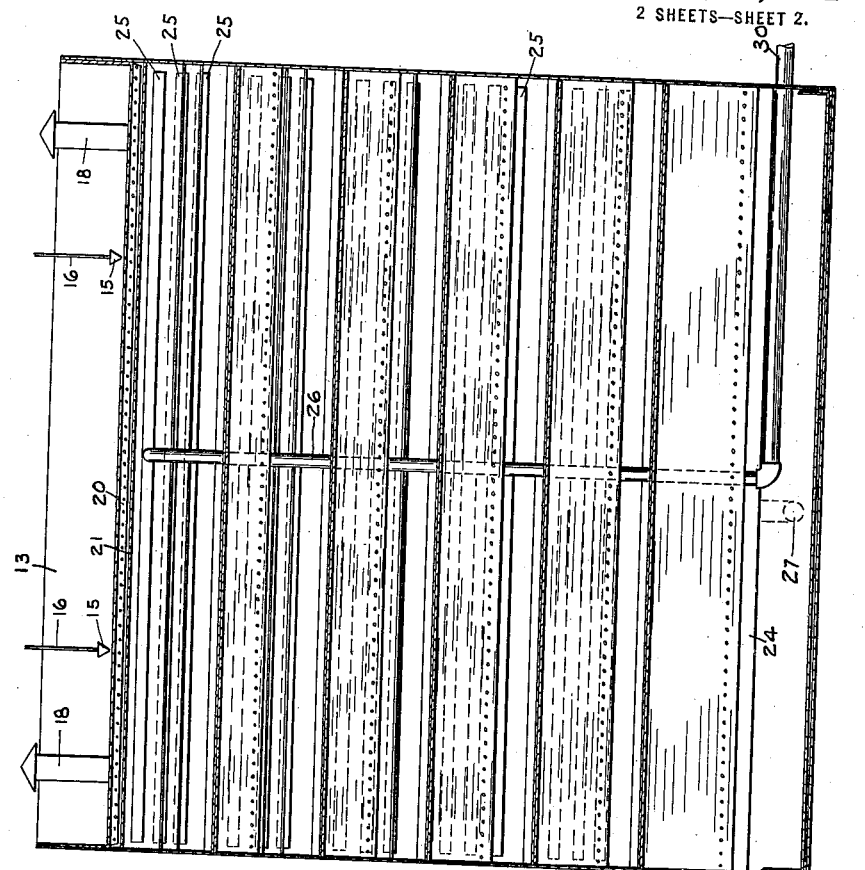
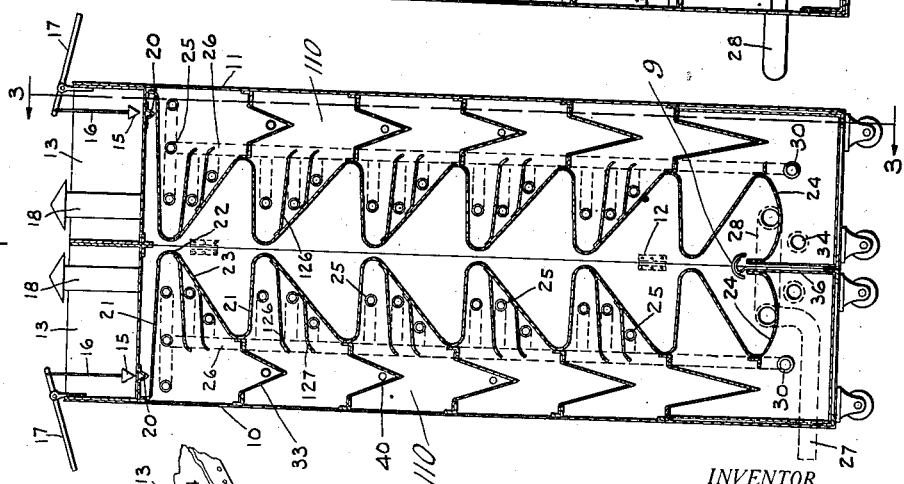
INVENTOR.
CHARLES W. DESOBRY.
BY
ATTORNEYS

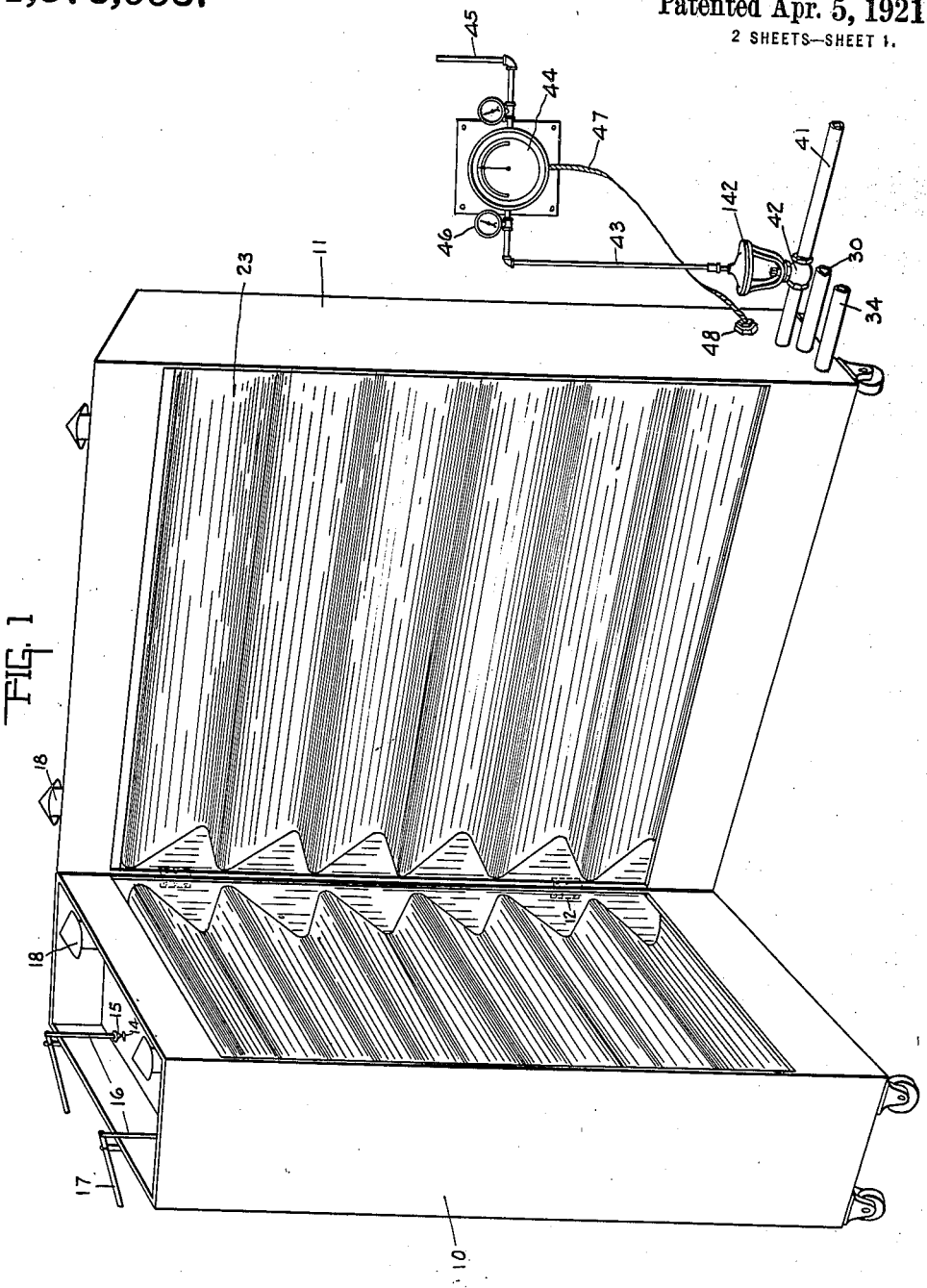

UNITED STATES PATENT OFFICE.

CHARLES W. DESOBRY, OF INDIANAPOLIS, INDIANA.

APPARATUS FOR HEATING AND COOLING LIQUIDS.

1,373,953. Specification of Letters Patent. Patented Apr. 5, 1921.

Application filed March 17, 1919. Serial No. 283,098.

*To all whom it may concern:*

Be it known that I, CHARLES W. DESOBRY, a citizen of the United States, and a resident of Indianapolis, county of Marion, and State of Indiana, have invented a certain new and useful Apparatus for Heating and Cooling Liquids; and I do hereby declare that the following is a full, clear, and exact description thereof, reference being had to the accompanying drawings, in which like numerals refer to like parts.

The object of this invention is the rapid and sanitary heating or cooling of a liquid to a uniform temperature. It has been used for the purpose of treating or pasteurizing large quantities of milk for sale, whereby the milk is rapidly heated or cooled to a uniform temperature.

One aim of the invention is to subject the milk or liquid to the same temperature all the time, the temperature being predetermined and controlled by the heating apparatus so that there will be no difficulty or doubt about all the liquid obtaining the proper and uniform temperature. Heretofore it has been customary to heat the milk or liquid by any suitable heating means, and by use of a thermometer in the milk or liquid determine when it has become sufficiently heated or cooled, and by mixing or tempering to equalize the milk or liquid. This is an awkward, clumsy and unsatisfactory mode of operation. In this invention the temperature of the heating or cooling water is regulated to obtain a predetermined and uniform temperature of the milk or liquid being treated.

Another aim of the invention is to prevent evaporation of the milk or liquid while being heated, by keeping the same in a closed receptacle. Still another aim of the invention is to facilitate the heating and cooling of liquids by the heating chamber of the apparatus being inclosed to prevent loss of heat by radiation.

Another feature of the invention consists in passing the milk or liquid by gravity over one side of a thin metal plate, and subject the opposite side to a spray of heated water for heating, or cold water or brine for cooling. Thus this metal plate is preferably formed corrugated in the shape of ledges with the inner surface of the ledges inclined downwardly so that the liquid will not fall over the ledges but will run down the same in a thin sheet and adhere to the surface of the corrugations from top to bottom of the plate, and therefore pass over a relatively large heating or cooling surface.

Another fature of the invention is in providing a pair of said heating or cooling devices folded together to form a closed chamber wherein there is a pair of oppositely located heating or cooling plates over each of which the milk or liquid flows, which prevents evaporation and loss of heat by the exposure of the liquid to the air.

Another feature of the invention consists in spraying the return hot water with live steam or exhaust from the supply pump for maintaining it at a uniform temperature and heating it before returning it to the supply tank.

Another feature of the invention consists in means for regulating the heating medium, rather than the liquid heated, for determining the heat of the liquid being treated. Also the variance in the volume of the liquid passing over the heating surface will not vary the temperature of the liquid being heated up to its rated capacity, and it will not overheat or underheat the liquid. So the liquid attains a definite and uniform temperature throughout. When used for cooling, cold water or brine are employed instead of hot water.

The full nature of the invention will be understood from the accompanying specification.

In the drawings, which are made a part of this application, Figure 1 is a front elevation of the device opened, parts being broken away. Fig. 2 is a transverse vertical section through the same when closed, and in operative condition. Fig. 3 is a vertical section on the line 3—3 of Fig. 2. Fig. 4 is a detail showing the valve mechanism for controlling the inlet of milk or liquid to the heating surface.

This device is preferably formed of two halves, consisting of external casings 10 and 11 hinged together at 12 at the rear so that the two halves can be brought together as shown in Fig. 2, or opened door like as shown in Fig. 1. While the device is in use, the two sections are closed together as shown in Fig. 2, and latched and locked in said position by yielding means 9, but while being cleaned they are open as shown in Fig. 1. The parts forming each half are substantially duplicates of each other.

The nature of the invention will be understood by referring to Fig. 2, wherein each half has at the upper end a milk or liquid receiving tank 13, in which the liquid to be treated is poured. There is an outlet 14 in the bottom of each tank adapted to be closed by a valve 15 on the stem 16, operated by a hand lever 17. In each tank there is also a ventilator 18 that extends through the bottom of the tank and to a point above the top of the tank.

The flow of milk, which passes from the tank through the opening 14 is regulated by the plug 15, and it enters a trough 20, which is perforated so that the milk sprays through the perforations upon the inclined top 21 of the heating or cooling surface of a corrugated plate. The top corrugation is shown as inclined very slightly so that the milk will flow in a sheet. Said heating or cooling plate is arranged with a succession of ledges or corrugations 22, which are curved so the sheet of milk will flow over them and adhere to them without dropping down over them. These ledges are placed one below the other and extend outward an equal distance. An inclined portion 23 of the plate extends from the inner side of each ledge down at a suitable angle to the upper horizontal surface 21 of the next ledge, and this construction is repeated throughout from top to bottom. The arrangement is understood by reference to Fig. 1. This construction gives the heating or cooling plate a relatively great superficial area, and the sheet of milk or liquid adheres to its surface from the time it reaches the top of it until it arrives at the bottom and enters the trough 24, which is the lower part of the plate. While the milk is making this trip over the heating or cooling plate, the opposite side of the plate is being heated or cooled by hot or cold water respectively sprayed against it through pipes 25. These sprays are supplied by the hot or cold water pipe or riser 26. Three of these spray pipes 25 are shown for each ledge, one near the top surface of the ledge, another about mid-way and below a drain plate 126 and a third is near the lower part of the ledge below a drain plate 127. The lower end of the heating or cooling plate is heated or cooled by being submerged in the heating or cooling liquid as shown, instead of the spray. The outer wall 10 or 11 and the adjacent corrugated plate form an inclosing chamber 110 adapted to contain temperature changing means in the nature of a heating or cooling media projected upon the corrugated plate.

After the milk reaches the trough 24 at the bottom, the left hand trough 24 discharges into an outlet pipe 27 which if desired may be submerged in the heating or cooling medium reservoir. The milk is conveyed from the right hand trough 24 to the left hand trough by a flexible tube 28, whereby the two sections of the apparatus can be opened and closed as shown in Fig. 1.

With this arrangement it is observed that there is a chamber between the two sections, as shown in Fig. 2, from which the gas and odors may escape through the ventilators 18 at the upper end.

As seen in Fig. 3 a vertical hot or cold water riser 26 is located near the middle leading from the supply pipe 30, and is connected with the laterally extending spray pipes 25. The water from these spray pipes strikes the rear surface of the heating or cooling plate and runs off the drain plates 126 and 127 into troughs 33, which are perforated and located one above the other, and the water sprays from one trough down through the perforations to the next trough below, and from the bottom trough the water discharges into a water reservoir or sump chamber at the bottom of the device. This causes a constant spraying and heating and distribution of water.

The milk outlet pipe 27 is in the lower part of one side of the apparatus and near the middle thereof. The object of this construction is to keep the milk in the hot water at the lower part of the device as long as possible. Hence, there is a hot water chamber at the lower part of the device formed by the bottom, end and outside walls and by an inside wall 36, so that the water may extend up to the top edge of the lower V-shaped trough, as seen in Fig. 2. This hot water chamber at the bottom is drained by the outlet pipe 34.

The water in the device is kept at the desired temperature, by a temperature controlling means, as shown in Fig. 1. The steam through a steam supply pipe 41, is regulated by the mechanism at the right hand side of Fig. 1, which is a mechanism heretofore used in the art for controlling the steam supply. There is a diaphragm valve 42 and thermostat 142 with a pipe 43 leading therefrom to a regulator 44, which is connected with an air pressure connection 45, and in the pipe 43 there is a gage 46. A capillary tube 47 leads to the connection 48 in the side of one of the sections, and is connected with a mercury bulb, not shown, in the inside.

The capacity of the apparatus is limited to the amount of milk or liquid which will flow over and cling to the heating or cooling surface, but that greatly exceeds the capacity of any apparatus heretofore in use. The capacity of a given apparatus may be increased by adding more spray pipes 25, until the limit above specified is reached.

The milk covered surfaces in this apparatus are very readily cleaned because they are exposed plates. Hence the device is sanitary, and easily kept clean.

Therefore, with this invention there is equal distribution of a uniform predetermined and controlled temperature changing liquid against a sheet plate or surface for the purpose of changing temperatures. The temperature of said liquid is changed by being subjected all the time to said predetermined and controlled temperature.

The variation in the flow of the liquid will not effect the final temperature. The device determines and controls the heating medium and prevents the liquid on the opposite side of the sheet plate or surface from being overheated when the lowest flow of the liquid occurs. It will heat all of the liquid to a uniform temperature and not overheat part and underheat part, thereby equalizing it to obtain a definite temperature. It obtains a final definite uniform temperature of the liquid by controlling the heating medium and not the liquid to be heated. Methods now in use for heating milk insert the temperature controller bulb in the milk and the diaphragm valve regulates the steam in the heating medium, consequently the greater the flow of milk the greater the heating medium must be and suddenly reducing the flow will cause some of the milk to become overheated.

It distributes, reheats and conveys the return heating medium back to the receptacle from which it was drawn and circulates and where the temperature is determined and controlled exhaust steam from the circulating pump is utilized for reheating. A very large volume of water can be circulated and distributed which makes it more economical and efficient than a large stream. It regulates the flow of liquid from the milk receptacle into the distributing trough.

The invention claimed is:

1. Apparatus for heating and cooling liquid including two substantially horizontally corrugated heating and cooling plates, a liquid containing means positioned above the corrugated heating plates and discharging liquid upon one side of each plate, and a heating pipe within each corrugation and discharging upon the opposite side of said plate for heat transferring purposes.

2. Apparatus for heating or cooling liquid, including a plate disposed so that liquid will flow in a thin sheet over the surface thereof, means for changing the temperature of the liquid as it flows over said plate, and means for controlling and changing the temperature changing means and thereby predetermining the temperature of the liquid when treated.

3. A receptacle for a liquid to be heated or cooled, a plate disposed substantially vertically for receiving on the surface of one side thereof the liquid as it comes from said receptacle and over which surface the liquid flows and adheres to the surface, means for changing and controlling the temperature of said plate, a trough at the lower end of the heating or cooling plate for receiving the heated or cooled liquid therefrom, and a ventilator for the part of the device containing the stream of liquid.

4. Apparatus for heating or cooling liquid including a plate disposed substantially vertically and along the surface on one side of said plate a liquid is adapted to flow, means positioned adjacent substantially the entire surface of said plate acting on substantially the entire opposite side of the plate for changing and determining the temperature of said plate, and means for inclosing the device on the side of the heating and cooling plate over which the liquid flows.

5. Apparatus for heating or cooling liquid including a plate disposed substantially vertically and along the surface on one side of said plate a liquid is adapted to flow, means positioned adjacent substantially the entire surface of said plate acting on substantially the entire opposite side of the plate for changing and determining the temperature of said plate, and means for inclosing the portion of the device in which the temperature changing means is located.

6. Apparatus for heating or cooling liquid, including a chamber having a horizontal corrugated metal plate for a side wall, means for supplying liquid to the top of said corrugated plate upon one side thereof, whereby it will flow over the exterior surface of said plate in a thin sheet, and means within the chamber and positioned adjacent substantially the entire inner surface of said plate and acting on substantially the entire surface of said plate for changing and determining the temperature thereof.

7. Apparatus for heating or cooling liquid, including two sections formed substantially alike and hinged together at one side whereby they can be opened and closed against each other, a chamber in each section with the inner walls of the chambers similarly formed so as to furnish two substantially vertically disposed surfaces and over each of which liquid is adapted to flow down and adhere thereto, whereby the portion of the device containing the liquid being treated will be inclosed when said sections are in closed position, and means for circulating a heating or cooling media in said chambers.

8. Apparatus for heating or cooling liquid, including two sections formed substantially alike and hinged together at one side whereby they can be opened and closed against each other, a chamber in each section, the inner walls of which chamber are corrugated, the corrugations of the two surfaces facing each other, whereby the liquid can flow over said corrugated surfaces and adhere to the same while flowing and there will be a closed chamber between said surfaces when said sections are in closed position, and means for circulating a heating or cooling media in said first mentioned chambers.

9. Apparatus for heating or cooling liquid, including two sections formed substantially alike and hinged together at one side whereby they can be opened and closed against each other, a chamber in each section, the inner walls of which chamber are corrugated and similarly formed so as to furnish two opposing surfaces, the corrugations having two surfaces facing each other, whereby the liquid can flow over said surfaces and adhere to the same while flowing and there will be a closed chamber between said surfaces, tank means above the surfaces for supplying liquid to each of said surfaces, and means for circulating a heating or cooling media in said first mentioned chambers.

10. Apparatus for heating or cooling liquid, including two sections formed substantially alike and hinged together at one side whereby they can be opened and closed against each other, a chamber in each section with the inner wall thereof similarly formed so as to furnish two substantially vertically disposed surfaces over each of which the liquid is disposed to flow down and adhere to the external surface thereof as it flows whereby the portion of the device containing the liquid being heated or cooled will be inclosed when said sections are in closed position, a trough at the bottom of each of said surfaces, a flexible tube at the hinged end of the device and leading from one trough to the other, and a liquid outlet pipe leading from one of said troughs, and means for circulating a heating or cooling media in said chambers.

11. Apparatus for heating or cooling liquid including a chamber having one side wall thereof substantially vertically disposed so that the liquid to be treated can flow over the outer surface thereof and adhere to the same as it flows, and spray pipes arranged in the chamber so as to spray water against substantially the entire inner surface of said wall.

12. Apparatus for heating or cooling liquid, including a chamber having one side wall thereof substantially vertically disposed so that the liquid to be treated can flow over the outer surface thereof and adhere to the same as it flows, and spray pipes arranged in the chamber so as to spray a temperature changing liquid against the inner surface of said wall, and other pipes in said chamber for maintaining the temperature changing liquid at the desired temperature within said chamber.

13. Apparatus for heating or cooling liquid, including a heating chamber having one side wall thereof substantially vertically disposed so that the liquid to be heated can flow over the same and adhere to the surface thereof, spraying pipes arranged in the heating chamber so as to spray water against the inner surface of the plate, over the outer surface of which the liquid to be heated flows, steam pipes in said heating chamber for maintaining the heat of the hot water therein, and drain pipes at intervals over the entire surface of the plate over which the liquid to be heated flows.

14. Apparatus for heating or cooling liquid, including a heating chamber having one side wall thereof substantially vertically disposed so that the liquid to be heated can flow over the same and adhere to the surface thereof, spraying pipes arranged in the heating chamber so as to spray water against the inner surface of the plate, over the outer surface of which the liquid to be heated flows, steam pipes in said heating chamber for maintaining the heat of the hot water therein, drain pipes at intervals over the entire surface of the plate over which the liquid to be heated flows, and perforated troughs located at intervals one above another for receiving the water draining from said drain plates.

15. Apparatus for heating and cooling liquid, including a heating chamber, the inner wall of which has a horizontally corrugated plate for heating the liquid, a liquid supply tank in the upper part of the device for supplying liquid to the outer surface of said corrugations, a plurality of water spray pipes located in said heating chamber or cooling chamber and arranged with one pipe near the top of each corrugation and other pipes near the lower inclined side of each corrugation, an inwardly extending drain plate between said pipes, a series of perforated troughs one above the other in said heating and cooling chamber, there being one trough at the inner portion of each corrugation, and a steam pipe in each trough for reheating the water.

In witness whereof, I have hereunto affixed my signature.

CHARLES W. DESOBRY.